US008769295B2

(12) United States Patent
Mulla et al.

(10) Patent No.: US 8,769,295 B2
(45) Date of Patent: Jul. 1, 2014

(54) COMPUTING SYSTEM FEATURE ACTIVATION MECHANISM

(75) Inventors: Dean Mulla, Saratoga, CA (US); Rahul Khanna, Beaverton, OR (US); Keith R. Pflederer, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1951 days.

(21) Appl. No.: 11/195,105

(22) Filed: Aug. 1, 2005

(65) Prior Publication Data

US 2007/0039054 A1 Feb. 15, 2007

(51) Int. Cl.
| G06F 21/00 | (2013.01) |
| G06F 21/31 | (2013.01) |
| G06F 21/10 | (2013.01) |

(52) U.S. Cl.
CPC ............... *G06F 21/31* (2013.01); *G06F 21/10* (2013.01)
USPC ............................................ 713/182; 726/26

(58) Field of Classification Search
CPC .......... G06F 21/73; G06F 21/10; G06F 21/31
USPC ................................ 726/34, 26; 713/191, 182
See application file for complete search history.

(56) References Cited

U.S. PATENT DOCUMENTS

| 5,365,587 A | * | 11/1994 | Campbell et al. ............. 713/183 |
| 5,530,749 A | * | 6/1996 | Easter et al. .................... 713/191 |
| 5,559,889 A | * | 9/1996 | Easter et al. .................... 380/30 |
| 5,708,715 A | * | 1/1998 | Vicard ........................... 713/191 |
| 5,826,015 A | * | 10/1998 | Schmidt .......................... 726/23 |
| 5,933,087 A | * | 8/1999 | Wright et al. ................. 340/5.21 |
| 5,982,899 A | * | 11/1999 | Probst ............................... 713/1 |
| 5,983,353 A | * | 11/1999 | McHann, Jr. .................. 713/310 |
| 6,304,970 B1 | | 10/2001 | Bizzaro et al. |
| 6,393,566 B1 | * | 5/2002 | Levine ........................... 713/178 |
| 6,944,857 B1 | * | 9/2005 | Glaser et al. ................... 717/173 |
| 7,188,255 B1 | * | 3/2007 | Toh et al. ....................... 713/191 |
| 7,458,002 B2 | | 11/2008 | Fischer et al. |
| 2004/0129952 A1 | | 7/2004 | Griesmer et al. |

(Continued)

FOREIGN PATENT DOCUMENTS

| DE | 10260884 | 12/2002 |
| DE | 10338032 | 8/2003 |

(Continued)

OTHER PUBLICATIONS

PCT, International Search Report and Written Opinion of the International Searching Autority, Application No. PCT/US2006/029529, mailed Jan. 2, 2008.

(Continued)

*Primary Examiner* — Saleh Najjar
*Assistant Examiner* — Oleg Korsak
(74) *Attorney, Agent, or Firm* — Blakely, Sokoloff, Taylor & Zafman LLP

(57) ABSTRACT

Embodiments of the invention are generally directed to apparatuses, methods, and systems for a computing system feature activation mechanism. In an embodiment, a computing system receives a remotely generated feature activation information. The computing system compares the remotely generated feature activation information with a built-in feature activation mechanism. In an embodiment, a feature of the computing system is activated if the remotely generated feature activation information matches the built-in feature activation mechanism. Other embodiments are described and claimed.

19 Claims, 7 Drawing Sheets

(56) References Cited

U.S. PATENT DOCUMENTS

| | | | |
|---|---|---|---|
| 2004/0158742 A1 | | 8/2004 | Srinivasan et al. |
| 2006/0129848 A1* | | 6/2006 | Paksoy et al. ............... 713/193 |
| 2006/0215433 A1 | | 9/2006 | Fischer et al. |
| 2006/0248095 A1* | | 11/2006 | Cozzani ..................... 707/100 |

FOREIGN PATENT DOCUMENTS

| | | |
|---|---|---|
| TW | 527545 | 4/2003 |
| TW | 552554 | 9/2003 |
| WO | WO 91/03011 A | 3/1991 |
| WO | WO 2007/016395 | 2/2007 |

OTHER PUBLICATIONS

PCT, International Preliminary Report, Application No. PCT/US2006/029529, mailed May 2, 2008.

PCT International Preliminary Report on Patentability and Written Opinion of the Int'l. Searching Authority for PCT/US2006/029529, Int'l. filed Jul. 27, 2006, mailing date Feb. 14, 2008, (6 pgs.).

Intel, "82801E Communications I/O Controller Hub (C-ICH) for Applied Computing", 2001.

Intel, "845G Chipset Graphics Memory Controller Hum (BMCH)" Revision 1.0, Whitepaper, May 2002.

PCT International Search Report and Written Opinion of the International Searching Authority, for PCT/US2006/029529, mailed Apr. 18, 2007, 10 pages.

Office Action by the German Patent and Trademark Office for German Patent Application No. 11 2006 002 072.2, dated Oct. 24, 2008, 4 pages (including English translation).

Office Action from foreign counterpart Taiwan Patent Office for Taiwan Patent Application No. 95124820, dated Aug. 26, 2009, 4 pgs.

Search Report from foreign counterpart Taiwan Patent Office for Taiwan Patent Application No. 95124820, dated Aug. 3, 2009, 1 pg.

Office Action from foreign counterpart German Patent Application No. 112006002072.2-53, mailed Oct. 24, 2008, 4 pages (Translation included).

Office Action from foreign counterpart German Patent Application No. 112006002072.2-53, mailed Nov. 4, 2009, 6 pages (Translation included).

Office Action from foreign counterpart Great Britain Patent Application No. GB0801688.3, mailed Nov. 26, 2009, 2 pages.

Point 4 response to Examiners action of Aug. 23, 2010, foreign counterpart Great Britain Patent Application No. 200680036340.3, response sent Oct. 6, 2010, 6 pages.

Office Action from foreign counterpart Great Britain Patent Application No. 200680036340.3, mailed Aug. 23, 2010, pp. 1-7 (Translation Included).

Grant from foreign counterpart Taiwan Patent Application No. 95124820, mailed Jun. 30, 2010, pp. 1-4 (Translation Included).

Second Office Action from foreign counterpart Chinese Patent Application No. 200680036340, mailed Mar. 31, 2010, pp. 1-12 (Translation Included).

Third Office Action from foreign counterpart Chinese Patent Application No. 200680036340, mailed Mar. 23, 2011, 8 Pages (Translation Included).

* cited by examiner

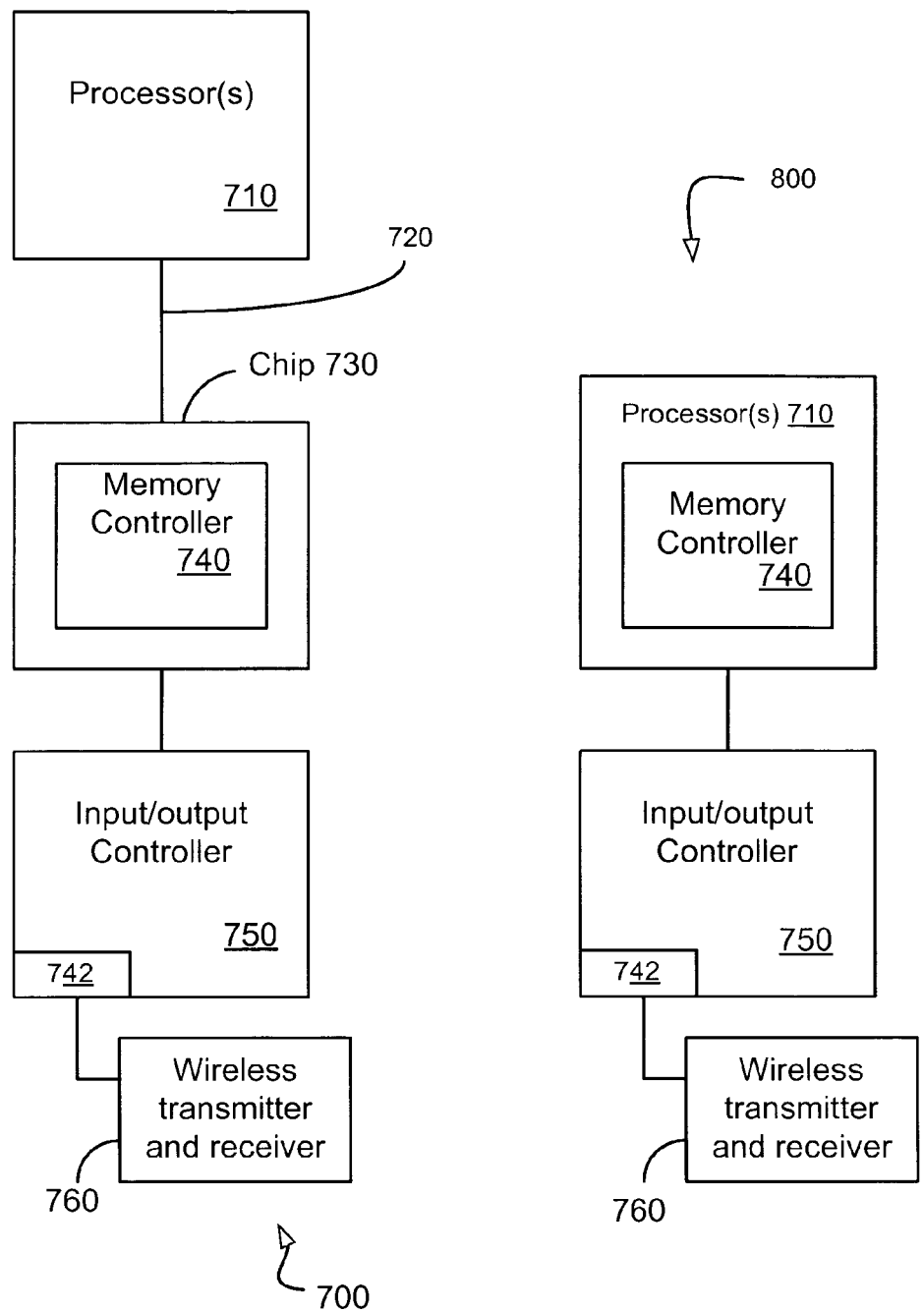

COMPUTING SYSTEM FEATURE ACTIVATION MECHANISM

TECHNICAL FIELD

Embodiments of the invention generally relate to the field of data processing and, more particularly, to systems, methods and apparatuses for a computing system feature activation mechanism.

BACKGROUND

A computing system can be manufactured to have one or more features that are disabled by default. The term "feature" refers to a component of the computer that provides (or enhances) a particular function. A "computing system" refers to a wide range of devices that process digitized information including, for example, a desktop computer, a laptop computer, a server, a network infrastructure device (e.g., router, switch, etc.), a digital home entertainment system, a cellular phone, and the like.

One reason for disabling a feature by default is to provide an upgrade path for the computer (or its components). Many software programs, for example, are designed to allow a user to initially obtain a simple version of the program and subsequently upgrade the simple version to a more robust version. In some cases, the difference between the two (or more) versions of the program is merely a question of which features of the program are disabled. The simple version of the program may be sold at a reduced price that reflects that not all features are available.

A user who wants to upgrade the software can purchase access to the more robust version from, for example, a software vendor. Typically, the software vendor does not need to send new software modules to the user who is upgrading the software. The reason for this is that, typically, the code supporting the more robust features is already in the program but this code is disabled. To enable the features of the software, the vendor may provide a key that enables a path so that one or more software features are activated. Once the path has been enabled, the user can access a more robust set of features.

The software-based model for feature activation has a number of limitations. For example, the key to enable the features is difficult to secure because it is a software-based key that is used in a large number of transactions. An unsecured key can be used to activate features without actually paying for the features. In addition, the software-based model does not readily limit the number of attempts a user may make to activate a feature. Thus, a hacker can repeatedly try to break the key until he or she is successful. For these and other reasons, the software-based model for feature activation is not well suited to hardware feature activation.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 7A and 7B are high-level block diagrams illustrating selected aspects of computing systems implemented according to an embodiment of the invention.

DETAILED DESCRIPTION

Embodiments of the invention are generally directed to apparatuses, methods, and systems for a computing system feature activation mechanism. In an embodiment, a computing system includes a built-in feature activation component. The built-in feature activation component is, in part, a hardware component that can activate features in the field (e.g., after the computing system has been sold to a user). As is further described below, in an embodiment, the built-in feature activation component provides hardware-based protection from certain security threats.

Figure 1:
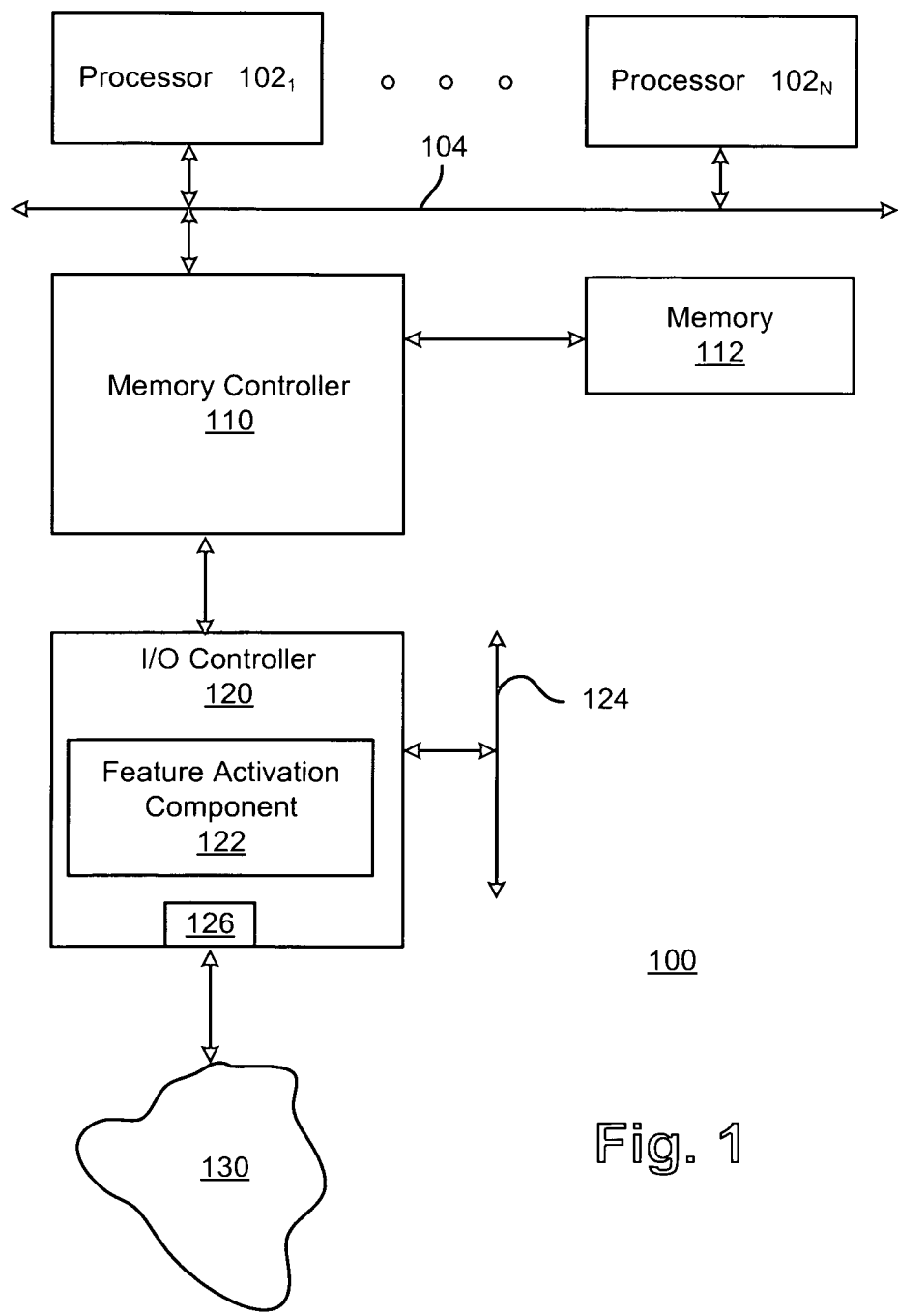
FIG. 1 is a high-level block diagram of selected aspects of a computing system, implemented according to an embodiment of the invention.

FIG. 1 is a high-level block diagram of selected aspects of computing system 100, implemented according to an embodiment of the invention. Computing system 100 includes one or more processors $102_1$-$102_N$. Processors $102_1$-$102_N$ can be, for example, central processing units, microcontrollers, application specific integrated circuits, and the like. In some embodiments, processors $102_1$-$102_N$ may support multithreading and/or may include one or more partitions.

Processors $102_1$-$102_N$ are coupled with memory controller 110 through processor interconnect 104 (e.g., a front-side bus). Memory controller 110 controls (at least partly) the flow of information between processors 102 and a memory subsystem. Memory 112 provides a memory hierarchy (e.g., volatile memory and persistent memory) for computing system 100. In one embodiment, memory 112 includes one or more dynamic random access memory (DRAM) devices.

Input/output (I/O) controller 120 controls, at least in part, the flow of information into and out of computing system 100. Interface 124 represents one or more I/O interfaces. These interfaces may include, for example, universal serial bus (USB), peripheral component interconnect (PCI), PCI express, and the like. In addition, I/O controller 120 includes one or more wired or wireless network interfaces 126 to interface with network 126. Network 126 may be any combination of a wired or wireless network including any combination of a local area network, a wide are network, an intranet, the Internet, and the like.

In one embodiment, I/O controller 120 includes feature activation component 122. Feature activation component 122 enables one or more features of computing system 100 to be dynamically activated and/or inactivated. In one embodiment, feature activation component 122 stores a common secret (e.g., in a read-only memory) that is not visible to entities that are external to feature activation component 122 (or external to computing system 100). The term "common secret" refers to a private value that is unique to a chip (e.g., unique to feature activation component 122). The secret is a common secret because, as is further described below, certain authorized remote computing systems may also have access to it. Feature activation component 122 is further described below with reference to FIGS. 2-7.

Figure 2:
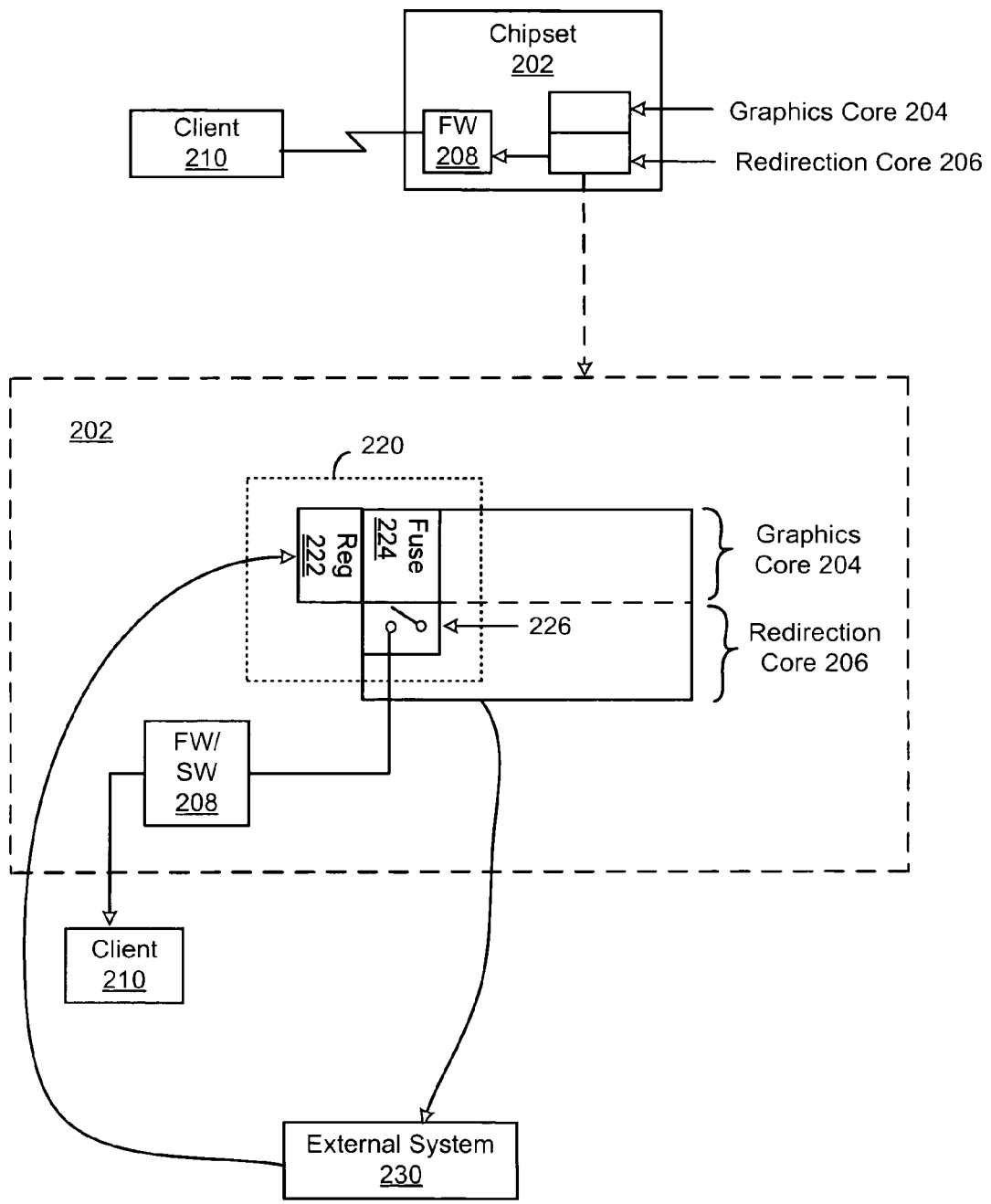
FIG. 2 is a high-level block diagram illustrating an embodiment of the invention in which a graphics redirection feature is dynamically activated.

FIG. 2 is a high-level block diagram illustrating an embodiment of the invention in which a graphics redirection feature is dynamically activated. Chipset 202 includes graphics core 204 and redirection core 206. Graphics core 204 generates graphical information to be displayed on a display device (not shown). Redirection core 206 is a hardware feature that redirects graphical information to a remote client 210 through, for example, firmware (or software) 208. In an embodiment, firmware 208 packetizes the graphical information before transporting it over a (wired and/or wireless) network to client 210. In one embodiment, redirection core 206 is disabled by default.

In an embodiment, chipset 220 includes feature activation component 220. Feature activation component 220 includes register 222, fuse 224, and switch 226. Fuse 224 is a write-once memory that may be set when feature activation component 220 is manufactured. In one embodiment, fuse 224 contains a value that is based, at least in part, on a common secret. For example, fuse 224 may store a hash of a chip serial number (or, simply, serial number), the common secret, and a feature identifier. As is further described below, fuse 224 can be used to validate the activation (or deactivation) of a feature.

In one embodiment, the stored hash value is a compressed hash value (or, simply, a compressed hash). A compressed hash refers to a hashing algorithm that uses a reduced number of bits to represent a hash value. For example, in one embodiment, every fifth bit of a hash value is used to represent the value. In such an embodiment, the uncompressed hash value may be, for example, 160 bits long and the corresponding compressed hash value is 32 bits long. In alternative embodiments of the invention, different (and/or additional) compression algorithms may be used to compress the hash. The use of a compressed hash allows embodiments of the invention to use fewer hardware resources (e.g., smaller fuses, registers, comparators, etc.).

Initially, redirection core 206 is disabled. For example, switch 226 may be initially open. At an arbitrary point in time, a user may decide to upgrade chipset 202 by activating redirection core 206. Activating redirection core 206 may involve providing certain information from chipset 202 to external system 230. In one embodiment, chipset 202 provides certain information (e.g., built-in feature information) to external system 230. This built-in feature information may be used to identify the feature to be activated and/or the system that is requesting the activation. In this context, the term "providing" refers both to action that is initiated from chipset 202 and action that is initiated from external system 230. Action that is initiated from external system 230 includes cases in which code on external system 230 accesses information from chipset 202.

In an embodiment, chipset 202 provides a serial number and a feature identifier to remote computing system 230. In one embodiment, the serial number is a chip serial number. For example, the serial number may be a serial number for one of the chips that form chipset 202. In an alternative embodiment, the serial number may be another identifier that identifies chipset 202 (and/or the computing system with which chipset 202 is associated). The feature identifier is a value that identifies the feature to be activated.

In response, to receiving the built-in feature information, external computing system 230 provides information (e.g., feature activation information) to chipset 202. This feature activation information may be provided in an encrypted format such as an RSA certificate. In an embodiment, the feature activation information includes a common secret that is associated with chipset 202. External system 202 may obtain the common secret (either directly or indirectly) from the manufacturer of chipset 202. For example, in an embodiment, external system 230 has access to a database of common secrets provided by the chipset manufacturer. In one embodiment, the feature activation information corresponds to the value stored in fuse 224. For example, the feature activation information may include a hash of the common secret, the serial number, and the feature identifier. A compressed hash algorithm may be used to generate the hash. In an alternative embodiment, a different component may be used to store and to provide the feature activation information.

In an embodiment, external system 230 provides the feature activation information to register 222. Feature activation component 220 compares the value in register 222 with the value in fuse 224. If the values match, then feature activation component 220 activates redirection core 206 by, for example, closing switch 226. In alternative embodiments, feature activation component 220 can dynamically activate almost any hardware feature. Examples of features that can be activated by feature activation component 220 include system capacity, system storage, input/output interfaces, display resolution, and nearly any other hardware (and/or firmware) feature.

Figure 3:
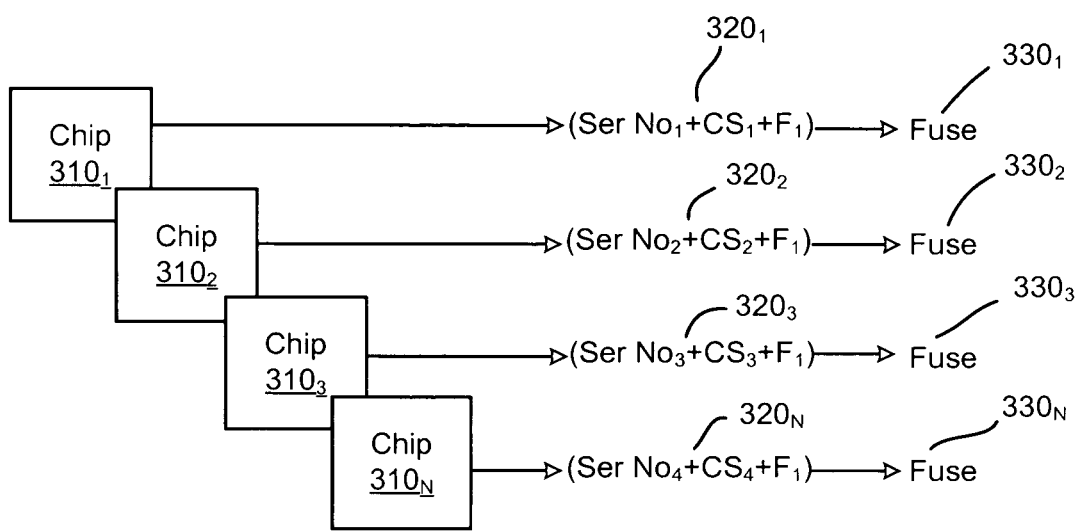
FIG. 3 is a conceptual diagram illustrating the manufacturing of chips, according to an embodiment of the invention.

FIG. 3 is a conceptual diagram illustrating the manufacturing of chips, according to an embodiment of the invention. Chips $310_1$-$310_N$ represent chips that are being manufactured. In an embodiment, each chip 310 includes a built-in value 320. Built-in value 320 is a hardware-based value that is not visible to entities that are external to chip 310. For example, built-in values 320 may be stored in fuses 330. In an embodiment, built-in value 320 is a compressed hash of the chip serial number, a common secret, and a feature identifier. In an alternative embodiment, a different value may be used for built-in value 320. In one embodiment, chips 310 may store a number of fuses 330 and each fuse 330 may be used to activate (or inactivate) a different feature. Each of chips $310_1$-$310_N$ may be used in different chipsets. In an embodiment, the common secret (e.g., $CS_1$-$CS_N$) is the same for the same set of chips that contains the feature to be activated.

Figure 4:
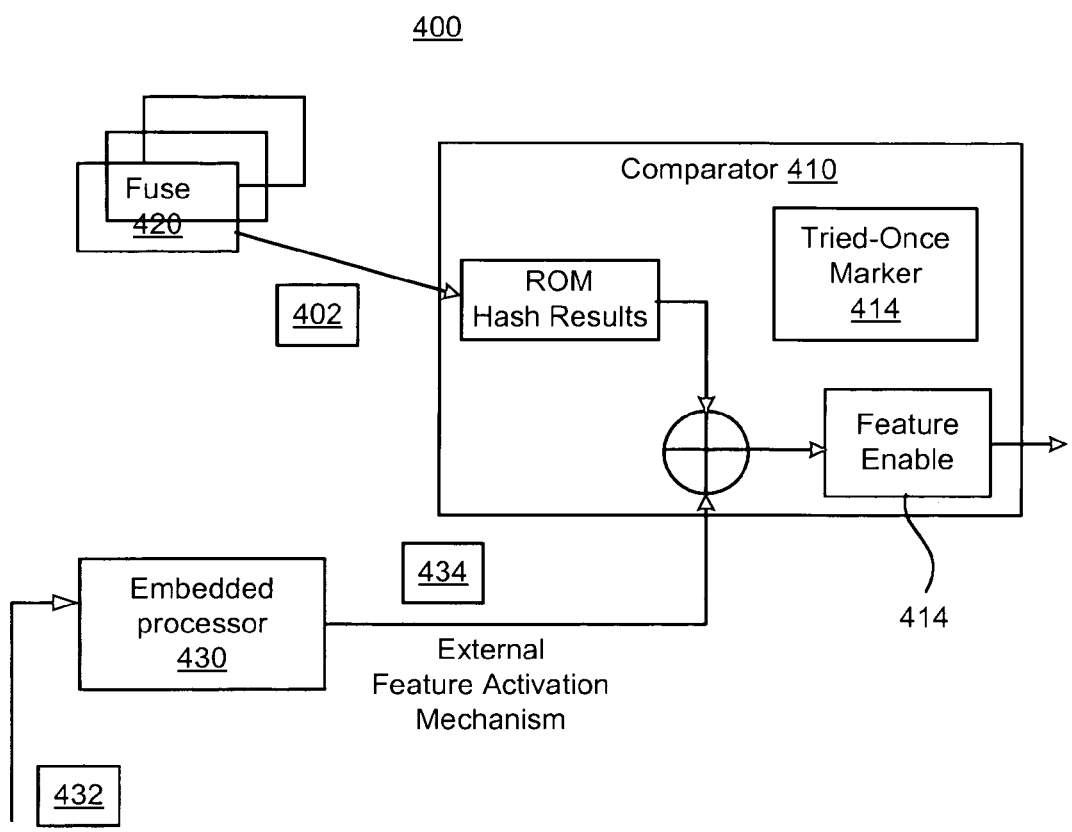
FIG. 4 is a block diagram illustrating selected aspects of a feature activation component implemented according to an embodiment of the invention.

FIG. 4 is a block diagram illustrating selected aspects of feature activation component 400 implemented according to an embodiment of the invention. In an embodiment, feature activation component 400 includes fuse 420, comparator 410, and embedded processor 430. In an embodiment, each fuse 420 stores built-in feature activation information. The built-in feature activation information may be based, at least in part, on a common secret. For example, in an embodiment, the built-in feature activation information is a compressed hash value of the common secret, a serial number, and a feature identifier. In an alternative embodiment, a hash of the built-in feature activation information is generated after the information is read from fuse 420.

In an embodiment, a remote computing system provides certificate 432 to embedded processor 430. Certificate 432 may be an RSA certificate that contains remotely generated feature activation information. Embedded processor 430 decrypts the certificate and extracts the remotely generated feature activation information. In one embodiment, the remotely generated feature activation information is a hash value of the common secret, the serial number, and the feature identifier. The remotely generated feature activation information 434 is provided to comparator 410.

Comparator 410 compares built-in feature activation information 402 with remotely generated feature activation information 434. If information 402 matches information 434, then feature enable 414 enables the feature. In one embodiment, if information 402 does not match information 434, then tried-once marker 414 is set. Tried-once marker 414 may be, for example, a register, a control bit, or any other component that is capable of providing an indication that an attempt to activate a feature has occurred.

In one embodiment, comparator 410 (or another element of feature activation component 400) is designed to allow only one attempt to activate a feature during each power cycle of the chip. The one-try/power-cycle limit makes breaking the encryption of the feature activation information extremely difficult. The reason for this is that a hacker would have to reboot the system each time he or she made an attempt to activate a feature. The time associated with rebooting the system renders the process of breaking the feature activation information cost prohibitive. In one embodiment, each chip uses unique feature activation information. Thus, even if a hacker cracks the encryption for one chip, he or she cannot activate the feature on another chip.

The one-try/power cycle limit supports the use of a compressed hash. Without the one-try/power cycle limit a compressed hash might be easier to crack because a compressed hash uses fewer bits to represent a value than an uncompressed hash. The reason for this is that there are, for example, fewer permutations of a 32 bit number than a 160 bit number. The reduced number of permutations, in theory, reduces the time it would take to find the correct value. If a hacker is forced to reboot the system between each try, however, the length of time it would take to crack a 32 bit number because prohibitively long.

Figure 5:
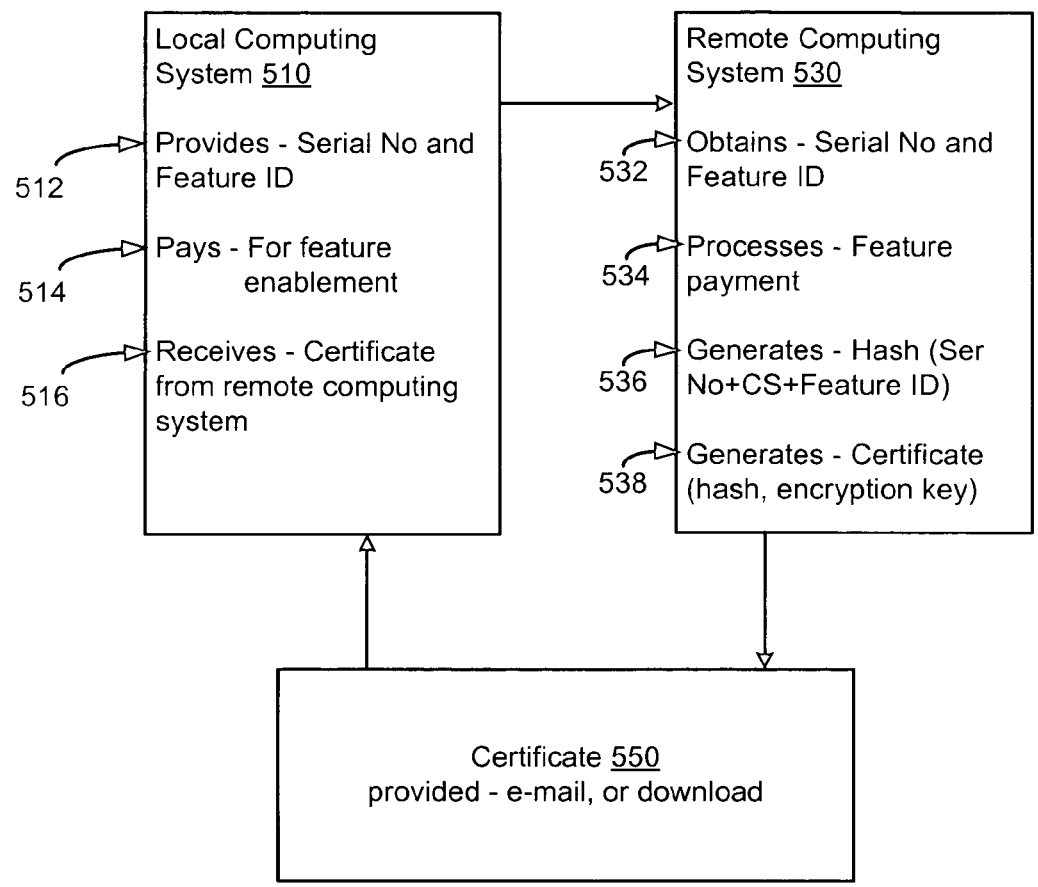
FIG. 5 is a conceptual diagram illustrating selected aspects of the exchange of information, according to an embodiment of the invention.

FIG. 5 is a conceptual diagram illustrating selected aspects of the exchange of information, according to an embodiment of the invention. System 500 includes local computing system 510, remote computing system 530, and certificate 550. In an embodiment, computing system 510 provides built-in feature information 512 to remote computing system 530. The built-in feature information 512 may include a serial number and/or a feature identifier. In addition, computing system 510 may provide a payment (e.g., an electronic payment) for the feature to be activated as shown by 514.

Remote computing system 530 receives the built-in feature information at 532 and processes the payment at 534. A hash containing the feature activation information is generated at 536. This hash is one example of remotely generated feature activation information. Computing system 530 generates an encrypted certificate at 538. The encrypted certificate may include the hash and an encryption key.

Remote computing system 530 provides certificate 550 to local computing system 510. Local computing system 510 receives the certificate and extracts the remotely generated feature activation information as shown by 516. In an embodiment, the remotely generated feature activation information is compared to corresponding built-in feature activation information. If the built-in and remotely generated values match, then the feature is activated. If not, a tried-once maker (e.g., tried-once marker 414 shown in FIG. 4) may be set to prevent another retry during, for example, the same power cycle.

Figure 6:
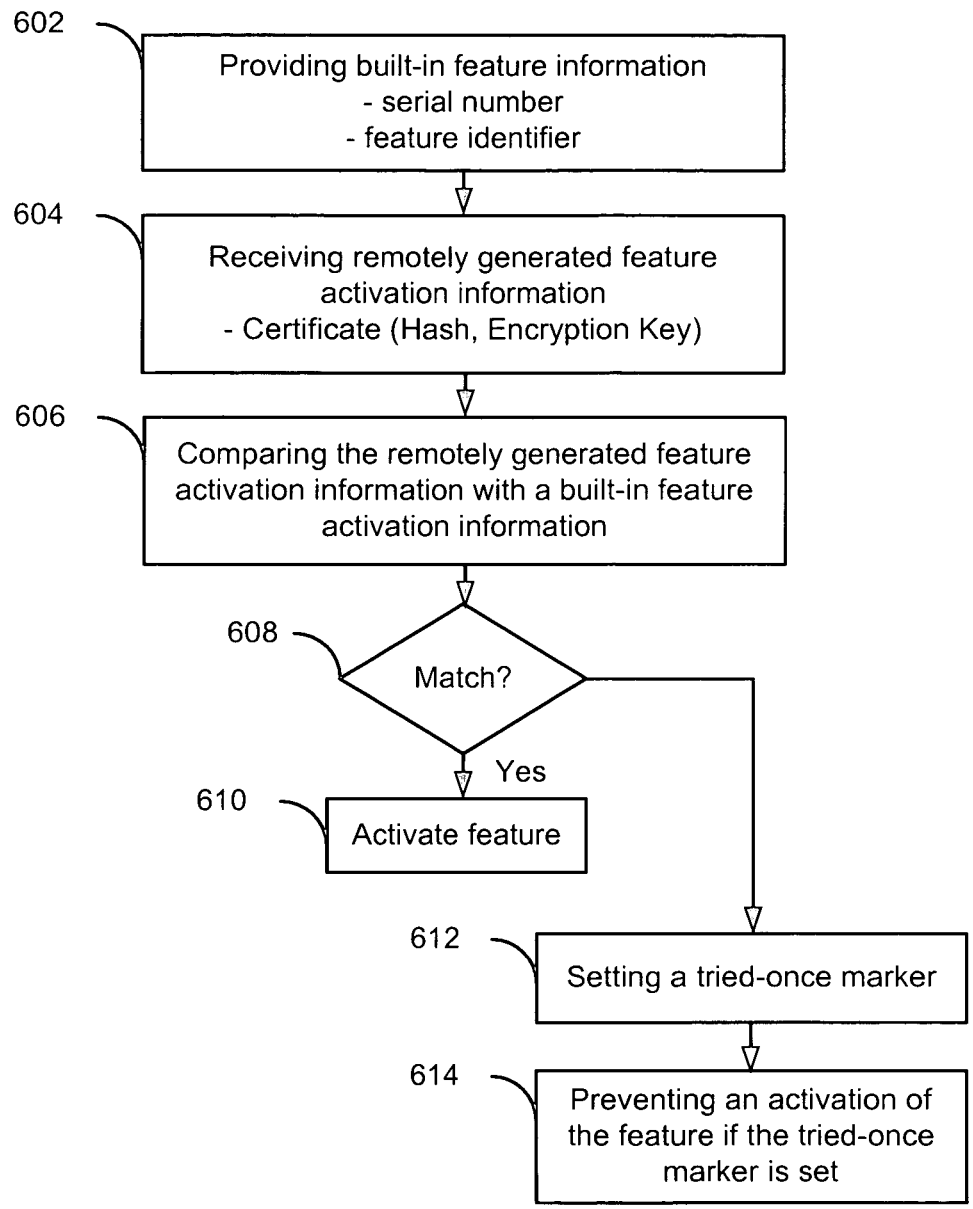
FIG. 6 is a flow diagram illustrating certain aspects of a method for activating a computing system feature, according to an embodiment of the invention.

Turning now to FIG. 6 the particular methods associated with embodiments of the invention are described with reference to a flowchart. The methods to be performed by a computing system (e.g., a feature activation component) may constitute hardware, firmware, state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing system causes the device to perform an action or produce a result.

FIG. 6 is a flow diagram illustrating certain aspects of a method for activating a computing system feature, according to an embodiment of the invention. A local computing system (e.g., computing system 100, shown in FIG. 1) provides built-in feature information to a remote computing system at 602. As used herein, the term "providing" includes cases in which the remote computing system queries the local computing system for (at least part of) the built-in feature information. For example, in an embodiment, the remote computing system queries the local computing system to obtain a chip serial number associated with a feature to be activated.

Referring to process block 604, the local computing system receives the remotely generated feature activation information from the remote system. In one embodiment, the remotely generated feature activation information is received in an encrypted certificate (e.g., an RSA certificate). The certificate may contain a hash of the remotely generated feature activation information. In one embodiment, a compressed hash algorithm may be used to generate the hash. For example, the compressed hash may include every fifth bit of the original hash.

Referring to process block 606, the remotely generated feature activation information is compared with built-in feature activation information. The term "built-in feature activation information" refers to information that is built-in to the hardware of the local computing system. In one embodiment, the built-in feature activation information is stored in a fuse (or other write-once memory) located on the local computing system (e.g., on the chip hosting the feature activation component or on the chip hosting the feature). The fuse may store a compressed hash of a serial number, a common secret, and a feature identifier.

In one embodiment, an embedded processor (e.g., embedded processor 430, shown in FIG. 4) extracts the remotely generated feature activation information and provides it to a comparator (e.g., comparator 410, shown in FIG. 4). In addition, firmware (and/or software) on the local computing system provides the built-in feature activation information. The comparator (as the name implies) compares the built-in value with the remotely generated value.

If the compared values match (608), then the feature is activated at 610. Activating the feature can be accomplished through a wide-variety of mechanisms including, for example, closing (or, conversely, opening) a connection (or otherwise providing a control and/or data path), applying power to the feature, and the like.

If the compared values do not match, then a tried-once marker (e.g., tried-once marker 414, shown in FIG. 4) is set at 612. In an embodiment, the tried-once marker is used to limit the number of activation attempts. For example, in one embodiment, only one activation attempt per power cycle is allowed. In an alternative embodiment, the limit on the number of allowed activation attempts may be implemented differently (e.g., a different number of attempts allowed; and/or the limit may be based on a different event; and/or may be per unit time, etc.).

Referring to process block 614, the feature activation component prevents the activation of the feature if the tried-once marker is set. The "prevention" can be accomplished in a number of different ways. In one embodiment, the feature activation component does not compare the built-in and remotely generated values, if the tried-once maker is set. In an alternative embodiment, a different mechanism may be used to prevent the activation of the feature (and/or prevent the attempt to activate the feature), if the tried-once marker is set. In an embodiment, the tried-once marker may be reset according to a reset policy. For example, the tried-once marker may be reset if the computing system is rebooted.

FIGS. 7A and 7B are block diagrams illustrating, respectively, selected aspects of computing systems 700 and 800. Computing system 700 includes processor 710 coupled with an interconnect 720. In some embodiments, the term processor and central processing unit (CPU) may be used interchangeably. In one embodiment, processor 710 is a processor in the XEON® family of processors available from Intel Corporation of Santa Clara, Calif. In an alternative embodiment, other processors may be used. In yet another alternative embodiment, processor 710 may include multiple processor cores.

According to one embodiment, interconnect 720 communicates with chip 730. In one embodiment, chip 730 is a component of a chipset. Interconnect 720 may be a point-to-point interconnect or it may be connected to two or more chips (e.g., of the chipset). Chip 730 includes memory controller 740 which may be coupled with main system memory (e.g., as shown in FIG. 1). In an alternative embodiment, memory controller 740 may be on the same chip as processor 710 as shown in FIG. 7B. In an embodiment, feature activation component 742 dynamically activates (or disables) features of computing systems 700 and/or 800.

Input/output (I/O) controller 750 I/O controls the flow of data between processor 710 and one or more I/O interfaces (e.g., wired and wireless network interfaces) and/or I/O devices. For example, in the illustrated embodiment, I/O controller 750 controls the flow of data between processor 710 and wireless transmitter and receiver 760. In an alternative embodiment, memory controller 740 and I/O controller 750 may be integrated into a single controller.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An apparatus comprising:
non volatile information storage circuitry to store built-in feature activation information, the built-in feature activation information determined from a mathematical operation that accepts each of a serial number, a common secret and a hardware feature identifier as different values of input information, each of said serial number, common secret and hardware feature identifier also being different forms of input information; and
feature activation circuitry coupled with the non volatile information storage circuitry, the feature activation circuitry to activate a hardware feature based on a comparison between a value based on the built-in feature activation information and externally generated feature activation information, wherein said common secret is not only known to a manufacturer of said non volatile information storage circuitry but is also known to an entity that effects upgrades on a system having said non volatile storage circuitry and said feature activation circuitry.

2. The apparatus of claim 1, further comprising:
a processor coupled with the feature activation circuitry, the processor to provide the externally generated feature activation information to the feature activation circuitry.

3. The apparatus of claim 2, wherein the non volatile information storage circuitry comprises:
a write-once memory.

4. The apparatus of claim 3, wherein the write-once memory is a fuse.

5. The apparatus of claim 3, wherein the value is based on:
a hash of the serial number, the common secret, and the hardware feature identifier.

6. The apparatus of claim 5, wherein the hash is a compressed hash.

7. The apparatus of claim 2, wherein the feature activation circuitry comprises a comparator to compare the value with the externally generated feature activation information.

8. The apparatus of claim 2, wherein the feature activation circuitry further comprises:
a tried-once marker, to indicate that an attempt to activate a feature has occurred during a current power cycle of the apparatus.

9. The apparatus of claim 8, wherein the tried-once maker is to prevent an attempt to activate the feature if the tried-once marker is set.

10. A method comprising:
   providing a value based on, at least in part, a serial number and a hardware feature identifier from a local computing system to a remote computing system;
   receiving a remotely generated feature activation information from the remote computing system;
   comparing the remotely generated feature activation information with a value based on built-in feature activation information that was previously stored in non volatile storage circuitry on a same semiconductor chip that performs the comparing, the built-in feature activation information determined from a mathematical operation that accepts a serial number, a common secret and a hardware feature identifier as different values of input information, each of said serial number, common secret and hardware feature identifier also being different forms of input information, wherein said common secret is not only known to a manufacturer of said semiconductor chip but is also known to said remote computing system; and
   activating a feature identified by the hardware feature identifier, if the remotely generated feature activation information is equal to the built-in feature activation information.

11. The method of claim 10, further comprising:
   setting a tried-once marker, if the remotely generated feature activation information is not equal to the built-in feature activation information.

12. The method of claim 11, further comprising:
   preventing an activation of the feature, if the tried-once marker is set.

13. The method of claim 10, wherein the remotely generated feature activation information is based, at least in part, on:
   a hash of the serial number, the common secret, and the feature identifier.

14. The method of claim 13, wherein the hash is a compressed hash.

15. The method of claim 10, wherein the built-in feature activation information is based, at least in part, on:
   a hash of the serial number, the common secret, and the feature identifier.

16. The method of claim 15, wherein the hash is a compressed hash.

17. The method of claim 16, wherein the built-in feature activation information is stored in a fuse.

18. A system comprising:
   non volatile information storage circuitry to store built-in feature activation information, the built-in feature activation information determined from a mathematical operation that accepts a serial number, a common secret and a hardware feature identifier as different values of input information, each of said serial number, common secret and hardware feature identified also being different forms of input information;
   feature activation circuitry coupled with the non volatile information storage circuitry; and
   a processor coupled with the feature activation circuitry, the processor to provide externally generated feature activation information to the feature activation circuitry; and
   a network interface coupled with the processor, the network interface to receive externally generated feature activation information from an external computing system, the feature activation circuitry to activate a hardware feature based on a comparison between the a value based on built-in feature information and the externally generated feature activation information provided by the processor, wherein said common secret is not only known to a manufacturer of said non volatile information storage circuitry and said feature activation circuitry but is also known to an entity that effects upgrades on said system.

19. The system of claim 18, wherein the information storage circuitry comprises:
   a fuse storing a compressed hash value, the compressed hash value based, at least in part, on the serial number, the common secret, and the feature identifier.

* * * * *